(12) United States Patent
Bluschke et al.

(10) Patent No.: US 12,744,598 B2
(45) Date of Patent: Sep. 22, 2026

(54) RADIO FREQUENCY SUPPORT FOR ESTABLISHING WIRELESS OPTICAL CONNECTIONS

(71) Applicant: SIGNIFY HOLDING B.V., Eindhoven (NL)

(72) Inventors: Andreas Felix Alfred Bluschke, Eindhoven (NL); Francisco David Rojas Calvente, Eindhoven (NL); Nancy Yushan Lee, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 298 days.

(21) Appl. No.: 18/580,189

(22) PCT Filed: Jul. 20, 2022

(86) PCT No.: PCT/EP2022/070317
§ 371 (c)(1),
(2) Date: Jan. 18, 2024

(87) PCT Pub. No.: WO2023/001876
PCT Pub. Date: Jan. 26, 2023

(65) Prior Publication Data

US 2025/0088271 A1 Mar. 13, 2025

(30) Foreign Application Priority Data

Jul. 22, 2021 (EP) .................................... 21187250

(51) Int. Cl.
*H04W 76/14* (2018.01)
*H04B 10/114* (2013.01)
*H04W 88/10* (2009.01)

(52) U.S. Cl.
CPC ..... *H04B 10/1149* (2013.01); *H04B 10/1143* (2013.01); *H04W 76/14* (2018.02); *H04W 88/10* (2013.01)

(58) Field of Classification Search
CPC ... H04W 76/14; H04B 10/40; H04B 10/1123; H04B 10/25753
See application file for complete search history.

(56) References Cited

U.S. PATENT DOCUMENTS 6,944,121 B1 * 9/2005 Weste ...................... H04B 1/28 370/208
2002/0094087 A1 * 7/2002 Dellmo ................ H04W 12/02 380/270

(Continued)

FOREIGN PATENT DOCUMENTS

CN 109618220 B 3/2021
WO WO-2018176444 A1 * 10/2018 ........... H04B 10/116
WO 2018206107 A1 11/2018

OTHER PUBLICATIONS

P. Gawlowicz, E. A. Jarchlo and A. Zubow, "WoV: WiFi-based VLC testbed," Jan. 2020, arXiv preprint arXiv:2001.08489, pp. 1-6.*

(Continued)

*Primary Examiner* — Sam Bhattacharya

(57) ABSTRACT

This invention relates to an incorporation of radio frequency (RF) access capabilities (e.g., Wi-Fi station capabilities) to an access point (AP) and/or endpoint (EP) of a wireless optical communication network (e.g. LiFi network) to be able to perform discovery, authentication, and association using an RF peer-to-peer mechanism (e.g. Wi-Fi Direct) and wake up the access point and/or endpoint, when it is established using the RF peer-to-peer mechanism that a wireless optical connection may be used as a high-speed data link. Advantageously, the RF link is used to configure the optical link and more advantageously, the AP controls its (Continued)

transmit power based on the coverage area of the wireless optical access point so that the RF communication may be setup in a timely manner allowing exchange of information on a optical link capabilities and to wake-up the optical transceiver(s).

15 Claims, 3 Drawing Sheets

(56) References Cited

U.S. PATENT DOCUMENTS

2004/0037566 A1* 2/2004 Willebrand .......... H04B 10/114 398/115
2009/0324216 A1* 12/2009 Golparian ................ G01V 3/12 398/25
2013/0229944 A1* 9/2013 Montemurro ........... H04W 4/21 370/254
2015/0201443 A1 7/2015 Emani et al.
2016/0037337 A1* 2/2016 Elliott ................... H04L 63/105 713/168
2016/0173586 A1* 6/2016 McCann ............. H04L 67/1044 709/204
2020/0195342 A1 6/2020 Rapaport et al.
2020/0281468 A1* 9/2020 Dawson ............... H04B 10/114
2023/0401310 A1* 12/2023 Davis .................... G06F 1/3246

OTHER PUBLICATIONS

Tang, Aimin et al., "Design and Implementation of an Integrated Visible Light Communication and Wifi System," IEEE 15th International Conference on Mobile Ad-Hoc and Sensor Systems, 2018 (9 Pages).

* cited by examiner

RADIO FREQUENCY SUPPORT FOR ESTABLISHING WIRELESS OPTICAL CONNECTIONS

CROSS-REFERENCE TO PRIOR APPLICATIONS

This application is the U.S. National Phase application under 35 U.S.C. § 371 of International Application No. PCT/EP2022/070317, filed on Jul. 20, 2022, which claims the benefit of European Patent application Ser. No. 21/187,250.2, filed on Jul. 22, 2021. These applications are hereby incorporated by reference herein.

FIELD OF THE INVENTION

The invention relates to wireless optical communication in e.g., LiFi networks for use in various different applications for home, office, retail, hospitality and industry.

BACKGROUND OF THE INVENTION

Wireless optical networks, often referred to as LiFi networks (named like Wi-Fi networks), enable (mobile) client devices (called end points (EP) in the following) like laptops, tablets, smartphones or the like to connect wirelessly to a network such as the internet. Wi-Fi achieves this using radio frequencies, but LiFi achieves this using the light spectrum which can enable unprecedented data transfer speed and bandwidth. It is important to consider that wireless data is required for more than just our traditional connected devices—today televisions, speakers, headphones, printer's, virtual reality (VR) goggles and even refrigerators use wireless data to connect and perform essential communications. Radio frequency (RF) technology like Wi-Fi is running out of spectrum to support this digital revolution and LiFi can help power the next generation of immersive connectivity.

Based on modulation (such as orthogonal frequency division multiplexing (OFDM) or discrete multi-tone (DMT)) information may be embedded in light signals by appropriately driving light sources such as Light Emitting Diodes (LED), lasers, or Vertical Cavity Surface Emitting Lasers (VCSELs). The information may be emitted as visible light—which when integrated in the illumination lighting structure might be visible illumination light or alternatively invisible light in the infrared or ultraviolet range. The information embedded in the light signal can be detected using any suitable light sensor. This can be a dedicated photocell (photo detector such as PIN photo diode), an array of photocells possibly with a lens, a reflector, a diffuser or a phosphor converter, or an array of photocells and a lens, often angular diversity receivers. E.g., the light sensor may be a dedicated photocell, a photodiode, an Avalanche Photo Diode (APD), a Silicon Photon Multiplier (SiPM), included in a dongle which plugs into the end point, or integrated in the end point device. The sensor may be a multi-purpose sensor such as an infrared detector initially designed for instance for 3D face recognition. Either way this may enable an application running on the end point to receive data via the light.

The modulated communication signal can be embedded in a visible or invisible optical signal emitted by an illumination source of an access device, such as an everyday luminaire, e.g., room lighting or outdoor lighting, thus allowing use of the illumination from the luminaires as a carrier of information. An example of a system wherein an illumination light is used for visible light communication that is integrated with a Wi-Fi access point is presented in the paper "Design and Implementation of an Integrated Visible Light Communication and WiFi System", by Tang Aimin et al, published in the 2018 IEEE 15$^{th}$ International Conference on Mobile Ad Hoc and Sensor Systems. The light thus comprises both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g., flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

International Patent Application WO2018/206107 A1 in turn discloses a method of sending WiFi service credentials to a Light Fidelity (Li-Fi) AP for transmission through Li-Fi signaling that is broadcast for reception by a wireless device. The method involves receiving and authenticating an authentication request that is received via a RF transceiver of a WiFi AP from the wireless device, which is responding to the WiFi service credentials that were broadcast through the Li-Fi signaling. The method then establishes a WiFi RF connection with the wireless device responsive to the authentication.

Moreover, LiFi devices are usually designed under the mentioned constraints with simple fixed hardware (optical, electrical and optoelectrical), having a specific target data rate at a specific target distance but must also perform well for higher and lower distances. Appropriately, designers choose/design carefully a set of components (photodiode, transimpedance amplifier (TIA), light emitting diode (LED), optics etc.), circuits and settings (modulation index, LED DC-Bias, pre-equalization, field of view (FoV) etc.), trying to get best performance for all circumstances, making various trade-offs because of the impossibility of this task.

Power saving in a LiFi devices is an important goal, in particular for battery powered devices, in view of the power consumption of optical transmitters (e.g., LED or laser diode (LD) such as vertical-cavity surface emitting laser (VCSEL)). Having these optical transmitters continuously switched on is wasteful of energy and shortens the life of these optical components.

Thus, a challenge for LiFi networks or other wireless optical networks is how to save power and optical component lifetime in the access points or endpoints. Another challenge is how to secure (encrypt) the wireless optical user data connection.

SUMMARY OF THE INVENTION

It is an object of the present invention to provide a wireless optical communication system that improves on the art when it comes to reduced power consumption, increased lifetime and/or security.

This object is achieved by a wireless optical access point as claimed in claim 1, a wireless optical endpoint as claimed in claim 3, a wireless optical communication system as claimed in claim 15.

Accordingly, at least security can be enhanced by providing control signaling of an RF-based peer-to-peer connection establishment. Moreover, power and optical component lifetime in the access points or endpoints can be saved by using an additional peer-to-peer RF connection (e.g., Wi-Fi Direct connection) for the control signaling and only turning on the optical transceiver when a wireless optical endpoint is in proximity of a wireless optical access point. More specifically, wireless optical devices (e.g., access points and/or endpoints) can be set in a low-power mode by powering down the modem for the optical connection (in case of a dedicated modem) and/or the optical transceivers, and an auxiliary RF channel can be used to support in waking up a wireless optical access point (e.g., LiFi AP) when a wireless optical endpoint (e.g., LiFi EP) is within range, as well as establishing a secure connection. By adding RF access capabilities to the wireless optical devices (e.g., LiFi AP and LiFi EP), a peer-to-peer RF mechanism (e.g., Wi-Fi Direct) can be used to perform this.

The proposed solution can be implemented in any wireless optical transmission system with little development and/or modification effort.

According to first aspect, a wireless optical access point is provided comprising: a wireless optical transceiver, an RF transceiver for generating control signaling, and an apparatus for controlling wireless optical communication is provided, the apparatus being configured to provide control signaling of an RF-based protocol for a peer-to-peer connection establishment for setting up a bidirectional wireless optical connection between a wireless optical access point and a wireless optical endpoint and to use the wireless optical connection for optical data transfer, wherein the apparatus is configured to exchange the control signaling between the wireless optical access point and the wireless optical endpoint via a peer-to-peer RF connection (e.g. Wi-Fi Direct connection) between the wireless optical access point and the wireless optical endpoint and wake up the wireless optical transceiver (403) and establish the wireless optical connection when the peer-to-peer RF connection has been set up.

An advantage of this approach as described above, is that devices may detect the presence of RF/optical capable devices using RF and set up an RF connection by means of a, preferably low-power, RF connection and use the RF control signaling for setting up the data transfer using the wireless optical connection.

The wireless optical transceiver for the wireless optical connection, that is in a power-saving state, may be woken up when the peer-to-peer RF connection has been set up. Thereby, optical power can be saved while control signaling is exchanged over the less power consumptive RF connection. The power-saving state may be a state wherein the optical front-end is powered down, as a whole or in part. As indicated above, powering down the output stage for driving the light sources will achieve a substantial power saving, but more aggressive power saving schemes may involve powering down the input amplifier, the entire optical front-end, or when the wireless optical connection has its own modem, also powering down the modem for the wireless optical connection.

According to a first option of the first aspect, the apparatus is configured to: receive LiFi characteristics of the wireless optical endpoint over the Wi-Fi peer-to-peer connection to the wireless optical access point and where the wake up of the wireless optical transceiver is subject to the LiFi characteristics of the wireless optical endpoint and the wireless optical access point matching. In this manner the wireless optical transceivers involved will be only woken up when the LiFi characteristics of the wireless optical access point and wireless optical endpoint match and potentially more power may be saved.

According to a second aspect a wireless optical endpoint is provided, the wireless optical endpoint comprising: a wireless optical transceiver, an RF transceiver for generating control signaling, and an apparatus for controlling wireless optical communication, the apparatus being configured to provide control signaling of a radio frequency, RF, based protocol for a peer-to-peer connection establishment for setting up a bidirectional wireless optical connection between a wireless optical access point and the wireless optical endpoint and to use the wireless optical connection for optical data transfer, wherein the apparatus is configured to: exchange the control signaling between the wireless optical access point and the wireless optical endpoint via a peer-to-peer RF connection between the wireless optical access point and the wireless optical endpoint wake up the wireless optical transceiver (503) and establish the wireless optical connection when the peer-to-peer RF connection has been set up.

An advantage of this approach as described above, is that devices may detect the presence of RF/optical capable devices using RF and set up an RF connection by means of a, preferably low-power, RF connection and use the RF control signaling for setting up the data transfer using the wireless optical connection.

The wireless optical transceiver for the wireless optical connection, that is in a power-saving state, may be woken up when the peer-to-peer RF connection has been set up. Thereby, optical power can be saved while control signaling is exchanged over the less power consumptive RF connection. The power-saving state may be a state wherein the optical front-end is powered down, as a whole or in part. As indicated above, powering down the output stage for driving the light sources will achieve a substantial power saving, but more aggressive power saving schemes may involve powering down the input amplifier, the entire optical front-end, or when the wireless optical connection has its own modem, also powering down the modem for the wireless optical connection.

According to a first option of the second aspect the apparatus is configured to: receive LiFi characteristics of the wireless optical access point over the Wi-Fi peer-to-peer connection and where the wake up of the wireless optical transceiver is subject to the LiFi characteristics of the wireless optical endpoint and the wireless optical access point matching.

In this manner the wireless optical transceivers involved will be only woken up when the LiFi characteristics of the wireless optical access point and wireless optical endpoint match and more power may be saved.

According to a third aspect, a wireless optical communication system is provided, that comprises a wireless optical access point according to the first aspect, and at least one wireless optical endpoint according to the second aspect.

According to a second option of which may be combined with the first option of the first and second topm aspects, the peer-to-peer RF connection may use the same Medium Access Control (MAC) layer as the wireless optical connection. This provides the advantage that MAC layer continuity can be provided when switching from the peer-to-peer RF connection to the wireless optical connection. This means among others that modem functionality from the MAC layer (and preferably above) could be shared, and amongst others encryption keys established in the peer-topeer RF connection setup could be reused for encrypting data on the wireless optical connection.

According to a third option which may be combined with the first and second option of the first or second aspects, the control signaling may be used for (i) authentication and (ii) generating or exchanging key materials for use in securing data transfer over the peer-to-peer RF connection and the wireless optical connection. Thus, authentication control signaling of a known peer-to-peer mechanism of an RF protocol can be used to authenticate the communication partner for wireless optical communication. The RF control signaling here also involve the generation or exchange of key materials used for the RF connection and repurposed for the optical connection. Generating or exchanging of key materials, may for example be implemented using key exchange or a key agreement protocols known in the art. In case of Wi-Fi, these protocols may involve WPA2 or WPA3 as certified by the Wi-Fi Alliance.

By means of key exchange or key agreement protocols, devices may either generate or exchange encryption keys for securing communication. Key materials may comprise the actual cryptographic keys, which may e.g. be exchanged in a key exchange protocol, or other cryptographic materials used by the communication partners to establish the cryptographic keys used for securing the communications.

According to a fourth option which may be combined with any one of the first to third options of the first aspect, a transmit power used for the peer-to-peer RF connection may be controlled based on the coverage area of the wireless optical transceiver of the wireless optical access point or based on a signal quality signaled from a receiving end of the peer-to-peer RF connection. Thereby, RF power consumption can be minimized by adapting it to the coverage area required for wireless optical transmission. For example, preferably, the transmit power for the RF connection may be tuned such that the RF connection used for signaling extends beyond the wireless optical coverage area, such that the optical transceiver may be woken up in a timely manner, in this way signaling may be completed prior to the communication partners entering each other's optical coverage area. However, at the same time the RF connection should be sufficiently localized to the optical cell to only wake up the optical transceiver when devices are likely to enter one another's optical coverage area and to allow a roaming device to identify the nearest optical cell. Typically, this could be achieved by setting the transmit power to a predetermined transmit power that results in an RF coverage area that is similar to the optical coverage area. Optionally this may be achieved by setting the transmit power of the RF transmitter to a predetermined power level, such that an RF connection may be established in an area extending in the range of 100-200% of the optical coverage area, or optionally an area extending in the range of 100-150% of the optical coverage area. For example, in case of a circular coverage area, where the distance between two adjacent APs is d, the RF transmit power may be set such that the RF coverage area (where an RF link may be successfully established) extends to 0.70 d. This may apply similarly to a wireless optical endpoint, where the endpoint may be configured to wake up its optical transceiver for access points having a signal quality (e.g., signal-to-noise ratio (SNR)) above a certain level. Conversely, instead of limiting the transmit power at the transmitter side, one may at the receiver-side require the received signal strength to exceed a predetermined threshold. Both solutions, limiting the transmit power and setting a required received signal strength threshold, aim to use the signal quality of the RF link to localize the RF communication link to the coverage area of the optical transceiver of the access point and/or endpoint. In comparison, the limitation of the transmit power at the transmitter has an advantage, that in a dense network of access points, the interferences between adjacent access points will be limited, whereas in such a scenario use of a received signal strength threshold may result in substantial RF interference.

According to a fifth option which may be combined with any one of the first to fourth options of the first and second aspects, the RF transceiver may be a Wi-Fi transceiver, where Wi-Fi refers to one of the IEEE 802.11 RF standards, and preferably one of the Wi-Fi Alliance defined and certified subsets thereof. This measure allows dual connectivity for providing control signaling (e.g., discovery, authentication, and association) via a Wi-Fi peer-to-peer connection and subsequent fast data exchange and optionally further control signaling via an wireless optical connection.

According to a sixth option which may be combined with any one of the first to fifth options of the first and second aspects, a single baseband chip or integrated circuit (which may implement the apparatus of the first aspect) may be provided for controlling the wireless optical transceiver and the RF transceiver. This allows for a compact design of a wireless optical device with enhanced security, low power consumption, and increased lifetime. By implementing the apparatus as a single integrated circuit, it becomes more difficult to interfere with the communication between the RF and optical communication stacks. When using an implementation wherein the MAC (and preferably higher) layer(s) of the RF and optical communication stacks are shared, use of a single integrated circuit may hinder tampering.

According to a seventh option which may be combined with any one of the first to sixth options of the first and second aspects, an optical detector may be provided for detecting a wireless optical signal, wherein the wireless optical transceiver may be activated in response to both the peer-to-peer RF connection having been setup and an output of the optical detector. Thereby, power consumption of the wireless optical devices can be reduced by activating the wireless optical transceiver only when an optical signal is received from the other connection end.

This option builds on the insight from the inventors, that although the wireless optical device may be in range for setting up an RF connection, this is no guarantee that the wireless optical device is in line of sight of the optical communication partner. For example, a mobile phone that is inside a backpack may be perfectly capable of setting up an RF connection with a ceiling mounted RF/LiFi access point but may not be able to setup an optical connection. Thus, this option may further improve on power saving.

According to an eighth option which may be combined with any one of the first to seventh options of the first aspect, the wireless optical access point may be configured to autonomously assume the role of a peer-to-peer group owner to setup a persistent peer-to-peer group. Thereby, the wireless optical access point can be configured to assume a role that also allows automatic reconnection, or pre-sharing of information to further speed up the connection process.

According to a nineth option which may be combined which may be combined with any one of the first to seventh options of the second aspect, the wireless optical end point, wherein the peer-to-peer RF connection is a Wi-Fi Direct connection and wherein the apparatus is configured to store: information from earlier connections with a wireless optical access point or pre-shared information of a wireless optical access point, for Wi-Fi Direct connection setup.

Advantageously, this way of working may enable faster connections from the endpoint device while roaming through the coverage areas of adjacent Wi-Fi Direct enabled wireless optical access points according to the invention.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet. It shall be understood that the wireless optical access point of claim 1, the wireless optical endpoint of claim 3, the wireless optical communication system of claim 15 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Various embodiments of the present invention are now described based on an optical illumination and communication system (i.e., LiFi system) with multi-carrier modulation-based transmission.

Figure 1:
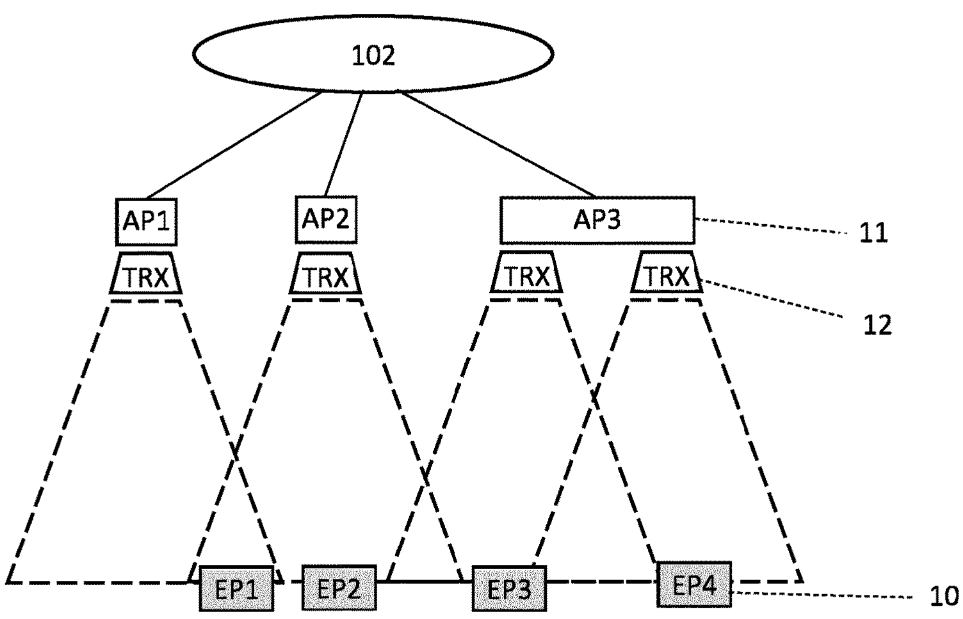
FIG. 1 shows schematically a block diagram of a LiFi network in which various embodiments can be implemented.

FIG. 1 shows schematically a block diagram of a LiFi network in which various embodiments can be implemented.

It is noted that—throughout the present disclosure—the structure and/or function of blocks with identical reference numbers that have been described before are not described again, unless an additional specific functionality is involved. Moreover, only those structural elements and functions are shown, which are useful to understand the embodiments. Other structural elements and functions are omitted for brevity reasons.

The LiFi network may comprise one or multiple access points (APs) AP1 to AP3 11, e.g. luminaires of a lighting system or alternatively dedicated communication devices, in either case connected to a backplane or backhaul or backbone network 102 (e.g. a wide or local area network (WAN/LAN), such as an Ethernet) e.g. via a switch (e.g. an Ethernet switch, not shown), whereby each AP 11 controls one or multiple optical transceivers (TRX) 12 (i.e. combined transmitters (optical emitters) and receivers (light sensors)) for optical communication towards end points (EP) EP1 to EP4 10, e.g., mobile user devices or user equipment (UE). Respective light beams generated by the TRXs 12 and defining coverage areas on the plane(s) of the EPs 10 are indicated by the dashed trapezoids in FIG. 1.

The luminaires can be any type of lighting unit or lighting fixture which comprises one or more light sources (including visible or non-visible (infrared (IR) or ultraviolet (UV)) light sources) for illumination and/or communication purposes and optionally other internal and/or external parts necessary for proper operation of the lighting, e.g., to distribute the light, to position and protect the light sources and ballast (where applicable), and to connect the luminaires to a power supply. Luminaires can be of the traditional type, such as a recessed or surface-mounted incandescent, fluorescent, or other electric-discharge luminaires. Luminaires can also be of the non-traditional type, such as fiber optics with the light source at one location and the fiber core or “light pipe” at another. An AP 11 may apply a time-slot schedule for communicating with EP(s) 10 in its coverage area. Where the coverage areas of the TRXs 12 overlap (as shown for EP1 in FIG. 1), coordination of APs 11 is needed if the related TRXs 12 belong to different APs 11.

A LiFi controller (not shown) which is configured to manage the LiFi network may be connected to the switch and can provide such coordination for supporting interference handling and handover when one of the EPs 10 moves into and out of overlapping coverage areas of the APs 11. The controller may be connected via the switch to the APs 11. The switch may be connected to a synchronization server (not shown) for synchronization management and to a router (not shown) for connecting to the backbone network 102.

According to various embodiments, a LiFi system for high-speed data communications is proposed, whereby discovery, authentication, and/or association of a LiFi data link is done via RF communication using a peer-to-peer mechanism (such as Wi-Fi Direct (e.g. as described e.g. in https://www.wi-fi.org/discover-wi-fi/wi-fi-direct) or other RF peer-to-peer communication options). High-speed data communication is then performed over the LiFi data link, wherein the LiFi interface can use any baseband protocol (e.g., ITU G.9991, IEEE 802.11, Universal Serial Bus (USB), etc.).

Figure 2:
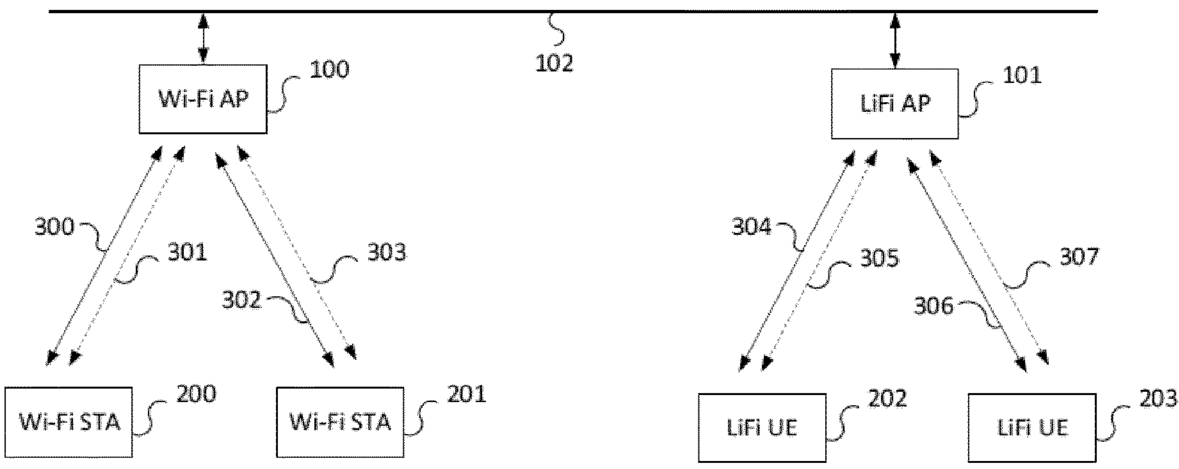
FIG. 2 shows schematically a block diagram of a standalone Wi-Fi network and a standalone LiFi network.

FIG. 2 shows schematically a block diagram of a standalone Wi-Fi network and a standalone LiFi network.

The LiFi network is composed of a LiFi AP 101 and LiFi EP devices or user equipment (LiFi UE) 202, 203. The LiFi UE 202, 203 contains a LiFi station function (LiFi STA, i.e., ability to communicate over light to the LiFi AP) and the LiFi AP 101 contains a LiFi STA function (i.e., ability to communicate over light to the LiFi STA function in a LiFi UE) and a distribution system access function, i.e., a wired connection to the main backbone (102) (usually through Ethernet or any other network access technology) that connects to the Internet (e.g., a Wide Area Network (WAN)) or an internal Local Area Network (LAN)). Data links 304, 306 and control links 305, 307 are established over respective optical channels.

For comparison, an equivalent Wi-Fi network comprising a Wi-Fi AP 100 and endpoint devices (Wi-Fi STAs) 200, 201 is also shown in FIG. 2 with corresponding data links 300, 302 and control links 301, 303 established over respective RF channels instead of optical channels.

Figure 3:
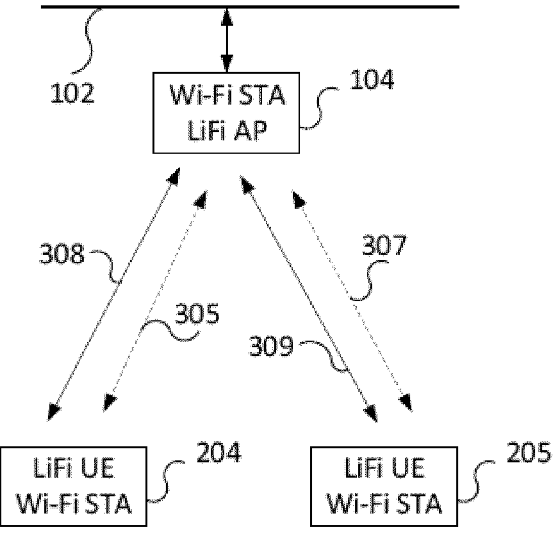
FIG. 3 shows schematically a block diagram of a LiFi network with auxiliary Wi-Fi support.

FIG. 3 shows schematically a block diagram of a LiFi network with auxiliary Wi-Fi support according to various embodiments.

Here, a different architecture is proposed for an enhanced LiFi AP 104 that contains the LiFi STA function to communicate via respective data links 308, 309 to LiFi STA functions in enhanced LiFi UEs 204, 205 and a distribution system access function for a wired connection to the main backbone 102. Namely, the enhanced LiFi AP 104 and the enhanced LiFi UEs 204, 205 each additionally include a Wi-Fi STA function for establishing respective control links 305, 307 through a peer-to-peer (P2P) RF connection, wherein after establishing the P2P RF connection, LiFi transceivers can be switched on in the LiFi UE 204, 205 and the LiFi AP 104 to establish a data connection with the LiFi AP 104 via the respective data links 308, 309.

It is noted that a typical LiFi connection is a line-of-sight connection (often with distance of less than 2 m) and the LiFi transceivers must be pointing at each other (within a certain beam angle). This means that users need to know where the LiFi AP 104 is located to point their LiFi UE 204, 204 at the LiFi AP 104. It also means that the Wi-Fi STA functions in the LiFi AP 104 and the LiFi UE 204, 205 may be simple and low power (e.g., implemented using a Wi-Fi Internet of Things (IoT) chip or module), since they only need to communicate within the coverage area of the LiFi AP 104 and are not required to transmit large amounts of data. Optionally, the Wi-Fi link may, when the LiFi connection is lost, e.g. because a user blocks the line-of-sight, be used as a back-up wireless connection.

To save power, the RF transmit power for the Wi-Fi STA function in the LiFi AP 104 can thus be set to the minimum needed for the Wi-Fi beacon to be receivable within the coverage area of the LiFi AP 104. Thereby, the Wi-Fi link can be adapted to the LiFi coverage area to throttle the transmit power of the RF advertisements (beacons) so that they can be received in the LiFi coverage area (or preferably even a bit outside of that), so that the LiFi link can be setup (just before) or when a LiFi UE gets in range. The required transmit power could be determined empirically based on the LiFi coverage area. In case of an array of LiFi APs, this could be done during a commissioning phase, also taking into account neighboring devices.

Figure 4:
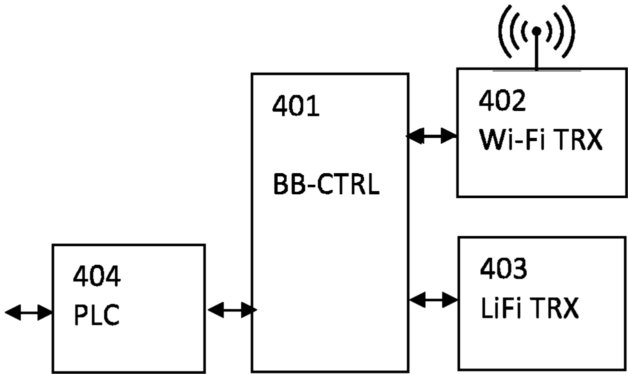
FIG. 4 shows schematically a block diagram of a LiFi AP with Wi-Fi capabilities according to an embodiment.

FIG. 4 shows schematically a block diagram of an enhanced LiFi AP with Wi-Fi capabilities according to an embodiment.

The LiFi AP comprises a Wi-Fi TRX 402 with RF connectivity and external or integrated (e.g., printed circuit board (PCB)) antenna, a LiFi TRX (e.g. a LiFi optical front end (OFE)) 403 with optical connectivity, a baseband control circuit (BB-CTRL) 401, and a Power Line Communication (PLC) backhaul connection 404 or other interface circuit to the WAN/LAN backbone (not shown).

The baseband control circuit 401 is configured to—among others—allow switching between the Wi-Fi TRX 402 and LiFi TRX 403 in dependence on the phase of link establishment. During link setup (e.g., discovery, authentication and/or association), the baseband control circuit 401 uses the Wi-Fi TRX 402 for providing an RF-based data connection. Then, during a subsequent data communication, the baseband control circuit 401 uses the LiFi TRX 403 for providing a fast optical data communication. The baseband control circuit may be a single integrated circuit (e.g., a single baseband chip-set for Wi-Fi and LiFi control) or a combination of a LiFi baseband control circuit and a Wi-Fi baseband control circuit.

As an exemplary implementation, the LiFi AP with Wi-Fi STA function may be integrated into a luminaire with Wi-Fi connectivity (e.g. a WiZ lamp that already contains a Wi-Fi STA function, which may be repurposed to also have a LiFi STA function, or alternatively where a LiFi baseband chip may be added to implement the LiFi STA function).

Figure 5:
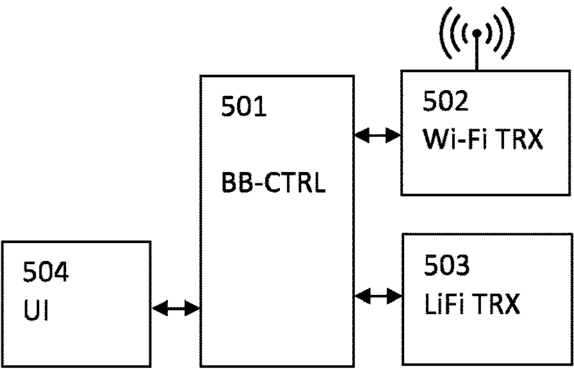
FIG. 5 shows schematically a block diagram of a LiFi EP with Wi-Fi capabilities according to an embodiment.

FIG. 5 shows schematically a block diagram of a LiFi EP or LiFi UE with Wi-Fi capabilities according to an embodiment.

Similar to the above LiFi AP, the LiFi UE comprises a Wi-Fi TRX 502 with RF connectivity and external or integrated (e.g. printed circuit board (PCB)) antenna, a LiFi TRX (e.g. a LiFi optical front end (OFE)) 503 with optical connectivity, and a baseband control circuit (BB-CTRL) 501 which may be a single circuit (e.g., a single baseband chip-set for Wi-Fi and LiFi control) or a combination of a LiFi baseband control circuit and a Wi-Fi baseband control circuit. Furthermore, a user interface (UI) 504 is provided to allow users to enter Wi-Fi credentials (e.g., network name and password or the like) required for authentication of the Wi-Fi access.

The baseband control circuit 501 is configured to—among others—allow switching between the Wi-Fi TRX 502 and LiFi TRX 503 in dependence on the phase of link establishment. During link setup (e.g. discovery, authentication and/or association), the baseband control circuit 501 uses the Wi-Fi TRX 502 for providing an RF-based data connection. Then, during a subsequent data communication, the baseband control circuit 501 uses the LiFi TRX 503 for providing a fast optical data communication.

The above Wi-Fi connection for RF-based exchange of control data for discovery, authentication and/or association of a LiFi connection or link can be based on Wi-Fi Direct which is a Wi-Fi technology defined by the Wi-Fi Alliance to allow capable devices to connect directly to each other quickly, securely and conveniently to do tasks such as printing, synchronization, and sharing of data.

More specifically, Wi-Fi Direct allows devices to communicate directly with each other using methods similar to traditional Wi-Fi without requiring the use of a central AP. Instead, the Wi-Fi devices (e.g., Wi-Fi AP and Wi-Fi STA) use a “Software Access Point” (Soft AP). Wi-Fi Direct technology as described in “Wi-Fi Peer-to-Peer (P2P) Technical Specification” enhances device to device connectivity by building upon the successful IEEE 802.11 infrastructure mode and letting devices negotiate who will take over the AP-like functionalities. Thus, legacy Wi-Fi devices are enabled to connect to Wi-Fi Direct networks.

In a typical Wi-Fi network, a client with a Wi-Fi STA function scans and associate to wireless networks available, which are created and announced by Wi-Fi APs. Each of the Wi-Fi devices has roles involving a different set of functionalities. A major novelty of Wi-Fi Direct is that these roles are specified as dynamic, and hence a Wi-Fi Direct device can implement both the role of a client and the role of an AP (sometimes referred to as Soft AP). These roles are therefore logical roles that could even be executed simultaneously by the same device (Concurrent mode).

Wi-Fi Direct devices or P2P devices communicate by establishing P2P groups, which are functionally equivalent to traditional Wi-Fi infrastructure networks. The device implementing AP like functionality in the P2P group is referred to as the P2P group owner (P2P GO), and devices acting as clients are known as P2P clients. This GO and client functionality may be dynamic and may be negotiated at the time of initial network setup. Two P2P devices discover each other and negotiate their roles (P2P Client and P2P GO) to establish a P2P group. Once the P2P group is established, other P2P clients can join the group as in a traditional Wi-Fi network. Legacy clients can also communicate with the P2P GO, as long as they support the required security mechanisms.

Three types of group formation techniques may be provided, which are standard, autonomous, and persistent cases.

The group formation procedures involve a first phase of determining the P2P GO (e.g., two P2P devices negotiate for P2P GO based on desire/capabilities to become a P2P GO or the P2P GO role is established at formation or at an application level) and a second phase of provisioning the P2P group (e.g., establishment of P2P group session using appropriate credentials or using Wi-Fi simple configuration to exchange credentials).

In the standard case, the P2P devices first discover each other and then negotiate which device will act as P2P GO. Wi-Fi Direct devices usually start by performing traditional Wi-Fi scan (active or passive), by means of which they can discover existent P2P groups and Wi-Fi networks. After this scan, a Wi-Fi Direct discovery algorithm is executed. Once the two P2P Devices have found each other, they start a GO negotiation phase. This may be implemented using a three-way handshake involving a GO negotiation request, response and confirmation, whereby the two devices agree on which device will act as P2P GO and on the channel in which the group will operate, which can be in the 2.4 GHz or 5 GHz bands. In order to agree on the device that will act as P2P GO, P2P devices may send a numerical parameter (GO Intent value) within the three-way handshake, and the device declaring the highest value may become the P2P GO. To prevent conflicts when two devices declare the same numerical parameter, a tie-breaker bit may be included in the GO negotiation request, which is randomly set every time a GO negotiation request is sent.

In the autonomous case, the role of the P2P GO is not negotiated. Instead, a P2P device announces itself as a GO and starts sending beacons. This process is much similar to the legacy Wi-Fi in which an AP directly sends beacons into the network to become discoverable. The autonomous group formation is simpler and faster than the standard group formation.

Finally, in the persistent case, during the group formation process, P2P devices can declare a group as persistent, by using a flag in a P2P capabilities attribute present in beacon frames, probe responses and GO negotiation frames. In this way, the devices forming the group store network credentials and the assigned P2P GO and client roles for subsequent re-instantiations of the P2P group. Specifically, after the discovery phase, if a P2P device recognizes to have formed a persistent group with the corresponding peer in the past, any of the two P2P devices can use the invitation procedure (a two-way handshake) to quickly re-instantiate the group. The GO negotiation phase can be replaced by the invitation exchange, and the WPS provisioning phase is significantly reduced because the stored network credentials can be reused.

In order to establish a communication, Wi-Fi P2P devices agree on the role that each Wi-Fi device will assume at the time of negotiation. Like a traditional Wi-Fi AP, a P2P GO announces itself through beacons containing an additional P2P Information Element (IE). The P2P IE may be included in all management frames. The P2P device which becomes the group owner may provide a dynamic host configuration protocol (DHCP) server application to provide P2P clients with IP addresses. In addition, only the P2P GO may be allowed to cross-connect the devices in its P2P group to an external network.

Furthermore, Wi-Fi Direct provides the ability to support service discovery at the link layer. In this way, prior to the establishment of a P2P group, P2P devices can exchange queries to discover the set of available services and, based on this, decide whether to continue the group formation or not.

Security provisioning starts after discovery has taken place and, if required, the respective roles have been negotiated. Wi-Fi Direct devices may implement Wi-Fi Protected Setup (WPS) to support a secure connection with minimal user intervention. In particular, WPS allows establishing a secure connection by introducing a personal identification number (PIN) in the P2P client or pushing a button in the two P2P devices. Following WPS terminology, the P2P GO may implement an internal registrar, and the P2P client may implement an enrollee. The operation of WPS is composed of two parts. In the first part, the internal registrar is in charge of generating and issuing the network credentials, i.e., security keys, to the enrollee. WPS is based on WPA-2 security and uses Advanced Encryption Standard (AES)-CCMP as cipher, and a randomly generated Pre-Shared Key (PSK) for mutual authentication. In the second part, the enrollee (P2P client) disassociates and reconnects using its new authentication credentials. In this way, if two devices already have the required network credentials (e.g., entered via the UI 504 of the LiFi UE), there is no need to trigger the first phase and they can directly perform the authentication via the respective control data connection.

Using WiFi-Direct as described herein above, APs in a LiFi network may be configured for autonomous group formation of persistent networks. In this manner end point devices, such as mobile phones roaming in an office or domestic setting, where the same EP devices frequently pass under the same APs, may cache information to minimize the overhead for setting up the WiFi-Direct connections.

Figure 6:
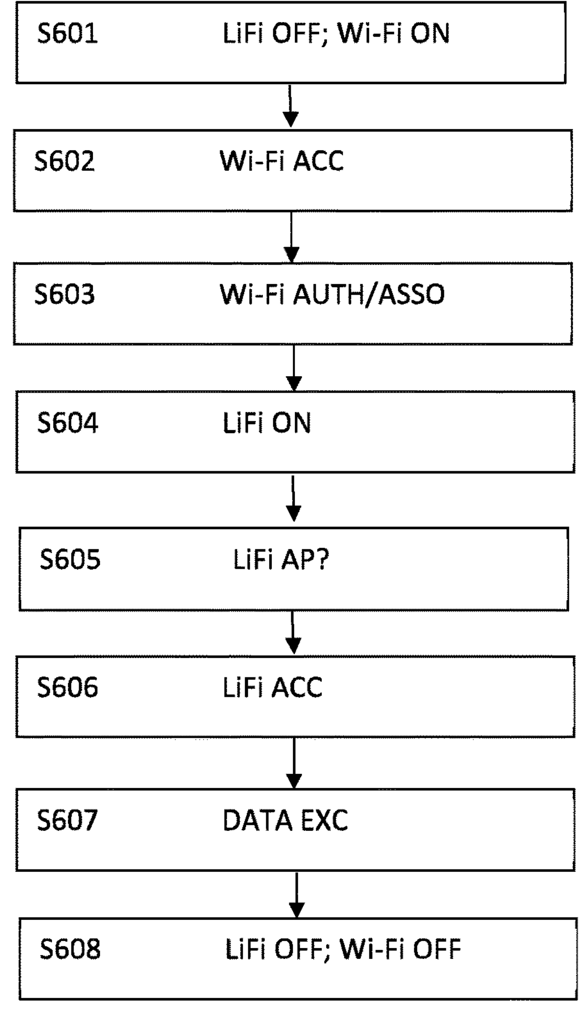
FIG. 6 shows a flow diagram of a LiFi communication procedure with Wi-Fi support according to various embodiments.

FIG. 6 shows a flow diagram of a low-power secure LiFi communication procedure with Wi-Fi Direct support according to various embodiments.

In the present example, the LiFi AP of FIG. 3 is installed with a Wi-Fi Direct GO capability operating in autonomous mode of group formation. More specifically, the LiFi AP may for example be configured to autonomously assume the role of a P2P group owner to setup a persistent P2P Group, which means that the LiFi AP is configured to assume a role that also allows automatic reconnection, or pre-sharing of information.

In step S601, the LiFi TRX of the LiFi AP may be turned off and the Wi-Fi TRX may be turned on to broadcast beacon frames. The power level of the Wi-Fi TRX may be tuned such that its coverage approximates the coverage area of the LiFi TRX.

Then, in step S602 a user brings a LiFi UE into the coverage area of the LiFi AP and points the LiFi UE at the LiFi AP. By default, the LiFi UE's LiFi TRX may be turned off. On the LiFi UE's UI, the user uses a "manage wireless networks" option or the like interface to selects the LiFi AP's Wi-Fi Direct network and enter its WPS-PIN (or its passcode for WPA3-Personal SAE once rolled out for Wi-Fi Direct) to obtain WiFi access. In step S603, the LiFi AP authenticates the LiFi UE over the established Wi-Fi Direct connection (e.g. control link 305 in FIG. 3) using the provided WPS-PIN, and the LiFi AP and LiFi UE perform an association process over Wi-Fi to generate encryption keys and optionally exchange LiFi characteristics over the Wi-Fi Direct connection.

After determining that the LiFi characteristics match, the LiFi AP and LiFi UE each turn on their LiFi TRXs in step S604.

Thereafter, in step S605, the LiFi UE's LiFi STA function searches for the LiFi AP.

If within range, the LiFi UE and LiFi AP establish a LiFi data connection (e.g. data link 308 in FIG. 3) in step S606 and use the encryption keys (that were established over the Wi-Fi Direct connection to encrypt data exchanged on data link). This has the advantages of working for devices where the chips used for LiFi (e.g., G.vlc chips) are not capable of generating per-device encryption keys but the chips used for Wi-Fi are, and being faster than generating another set of encryption keys over LiFi. Alternatively, the LiFi UE and the LiFi AP can perform a new association process over LiFi to generate encryption keys for use on the LiFi link.

In the subsequent step S607, the LiFi UE and LiFi AP are now able to exchange data securely over LiFi via a fast optical data link. In an example, the Wi-Fi Direct connection may use the same MAC layer as the LiFi data connection, so that the exchanged encryption keys can be reused.

Finally, in step S608, the LiFi AP and the LiFi UE turn off their LiFi TRXs and terminate the Wi-Fi Direct session after the LiFi UE moves out of coverage and stays out of coverage for some (configurable) time or after the user manually ends the session. The Wi-Fi/LiFi Direct WPS-PIN could be viewed in a smartphone app (e.g., integrate into the app of a WiZ lamp). Or, it could be statically configured in the LiFi AP like the network password for a home Wi-Fi router. A more secure option could be to have a temporary PIN that automatically updates (e.g., every 30 seconds) as described in https://docs.microsoft.com/en-us/surface-hub/surface-hub-Wi-Fi-direct.

Wi-Fi Direct may be limited to a small number of simultaneous connections, so that the proposed architecture may be used for an isolated LiFi AP handling a small number of LiFi UEs at a time.

In an alternative scenario with no need for a Wi-Fi STA in the LiFi UE, a LiFi AP that supports Wi-Fi Direct GO capability over a LiFi control link ("LiFi Direct") is installed. By default, its LiFi TRX is turned on and broadcasts beacon frames.

Then, a LiFi UE is brought close to the LiFi AP and its LiFi TRX is turned on to search for available "LiFi Direct" hosts.

On the LiFi UE's "manage wireless networks" option of the UI, the LiFi AP's "LiFi Direct" network is selected and its "LiFi Direct" WPS-PIN is entered. In response, the LiFi AP authenticates the LiFi UE over the "LiFi Direct" connection (LiFi control link 305 of FIG. 2) using the provided WPS-PIN and the LiFi AP and the LiFi UE establish WPA2-Personal encryption keys over the "LiFi Direct" connection.

Finally, the LiFi UE and the LiFi AP use the encryption keys (that were established over "LiFi Direct" connection) for optical data exchange on a LiFi data connection (e.g., LiFi data link 304 of FIG. 2).

This alternative scenario also solves the discovery, authentication, and association in a LiFi system and provides enhanced security in the LiFi system.

In the above embodiments, the LiFi UE may thus wake up its LiFi TRX once a Wi-Fi Direct link is being or has been set up. This allows for a more power-efficient implementation, in particular when the Wi-Fi/LiFi baseband control circuits (e.g., processors) are sharing the same hardware. In a specific example, an infrared (IR) detector could be used to switch on the LiFi part of the LiFi devices when a LiFi signal is detected.

To summarize, an incorporation of radio frequency (RF) access capabilities (e.g., Wi-Fi station capabilities) to an access point (AP) and/or endpoint (EP) of a wireless optical communication network (e.g. LiFi network) has been described, to be able to perform discovery, authentication, and association using an RF peer-to-peer mechanism (e.g. Wi-Fi Direct) and/or wake up the access point and/or endpoint, when a wireless optical connection is used as a high-speed data link.

While the invention has been illustrated and described in detail in the drawings and foregoing description, such illustration and description are to be considered illustrative or exemplary and not restrictive. The invention is not limited to the disclosed embodiments. The proposed detection and/or selection procedures can be applied to other types of wireless networks. In particular, the invention is not limited to a combination of LiFi and Wi-Fi systems. It can be applied to all kinds of wireless optical transmission systems (e.g., the Trulifi 6002 range of wide coverage point-to-multi-point LiFi products) and all kinds of RF systems (e.g., all types of IEEE 802.11 families, ZigBee, Bluetooth, Near Field Communication (NFC), etc.). Instead, the devices use a "Software Access Point" (Soft AP). Alternative RF-based peer-to-peer mechanism may be based on the ad-hoc mode of operation of the original IEEE 802.11 standard or on the Wi-Fi device to device communications space according to IEEE 802.11z (Tunneled Direct Link Setup (TDLS)) where directly connected Wi-Fi STAs are associated with the same Wi-Fi AP.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations or procedures like those indicated in FIG. 6 can be implemented as program code means of a computer program and/or as dedicated hardware of the receiver devices or transceiver devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A wireless optical access point comprising:

a wireless optical transceiver, a Radio Frequency, RF, transceiver for transmitting and receiving RF signals, and an apparatus for controlling wireless optical communication, the apparatus being configured to provide control signaling of a radio frequency, RF, based protocol using the RF transceiver, for a peer-to-peer connection establishment for setting up a bidirectional wireless optical connection between the wireless optical access point and a wireless optical endpoint and to use the wireless optical connection for optical data transfer, wherein the apparatus is configured to:

exchange, using the RF transceiver, the control signaling between the wireless optical access point and the wireless optical endpoint via a peer-to-peer RF connection between the wireless optical access point and the wireless optical endpoint, and wake up the wireless optical transceiver and establish the wireless optical connection when the peer-to-peer RF connection has been set up.

2. The wireless optical access point of claim 1, wherein the apparatus is configured to: receive LiFi characteristics of the wireless optical endpoint over the Wi-Fi peer-to-peer connection to the wireless optical access point and where the wake up of the wireless optical transceiver is subject to the LiFi characteristics of the wireless optical endpoint and the wireless optical access point matching.

3. The wireless optical access point of claim 1, wherein the peer-to-peer RF connection uses the same MAC layer as the wireless optical connection.

4. The wireless optical access point of claim 1, wherein the RF transceiver is a Wi-Fi transceiver, and the peer-to-peer RF connection is a Wi-Fi Direct connection.

5. The wireless optical access point of claim 1, wherein the control signaling is used for authentication and generating or exchanging of encryption key materials for use in securing data transfer over the peer-to-peer RF connection and the wireless optical connection.

6. The wireless optical access point of claim 1, wherein the apparatus is configured to control a transmit power used for the peer-to-peer RF connection based on the coverage area of the wireless optical transceiver of the wireless optical access point.

7. The wireless optical access point of claim 1, wherein the RF transceiver is a Wi-Fi transceiver.

8. The wireless optical access point of claim 7, wherein the peer-to-peer RF connection is a Wi-Fi Direct connection and wherein the apparatus is configured to autonomously set up the wireless optical access point in the role of a peer-to-peer group owner arranged to set up a persistent peer-to-peer group.

9. The wireless optical endpoint of claim 7, the wireless optical endpoint configured to operate in a peer-to-peer group with the wireless access point, wherein the peer-to-peer RF connection is a Wi-Fi Direct connection, and the apparatus configured to store: network credentials and the assigned peer-to-peer group-owner and group-client role information from connections with the wireless optical access point or pre-shared information of a wireless optical access point, for subsequent re-instantiation of the peer-to-peer group.

10. The wireless optical access point of claim 1, wherein the apparatus is implemented as a single baseband chip or integrated circuit.

11. The wireless optical access point of claim 1, further comprising an optical detector for detecting a wireless optical signal, wherein the apparatus is configured to wake up the wireless optical transceiver in response to an output of the optical detector in addition to the peer-to-peer RF connection having been set up.

12. The wireless optical access point of claim 1, wherein the wireless optical connection is a G.vlc connection.

13. An optical wireless communication system comprising the one or more wireless optical access point of claim 1 and the one or more wireless optical end points.

14. A wireless optical endpoint comprising:

a wireless optical transceiver, an RF transceiver for transmitting and receiving RF signals, and an apparatus for controlling wireless optical communication, the apparatus being configured to provide control signaling of a radio frequency, RF, based protocol using the RF transceiver, for a peer-to-peer connection establishment for setting up a bidirectional wireless optical connection between a wireless optical access point and the wireless optical endpoint and to use the wireless optical connection for optical data transfer, wherein the apparatus is configured to:

exchange, using the RF transceiver, the control signaling between the wireless optical access point and the wireless optical endpoint via a peer-to-peer RF connection between the wireless optical access point and the wireless optical endpoint, and wake up the wireless optical transceiver and establish the wireless optical connection when the peer-to-peer RF connection has been set up.

15. The wireless optical endpoint of claim 14, wherein the apparatus is configured to: receive LiFi characteristics of the wireless optical access point over the Wi-Fi peer-to-peer connection and where the wake up of the wireless optical transceiver is subject to the LiFi characteristics of the wireless optical endpoint and the wireless optical access point matching.

* * * * *